April 15, 1958   C. O. FRUSH   2,830,557
HOG FEEDER
Filed Dec. 22, 1954
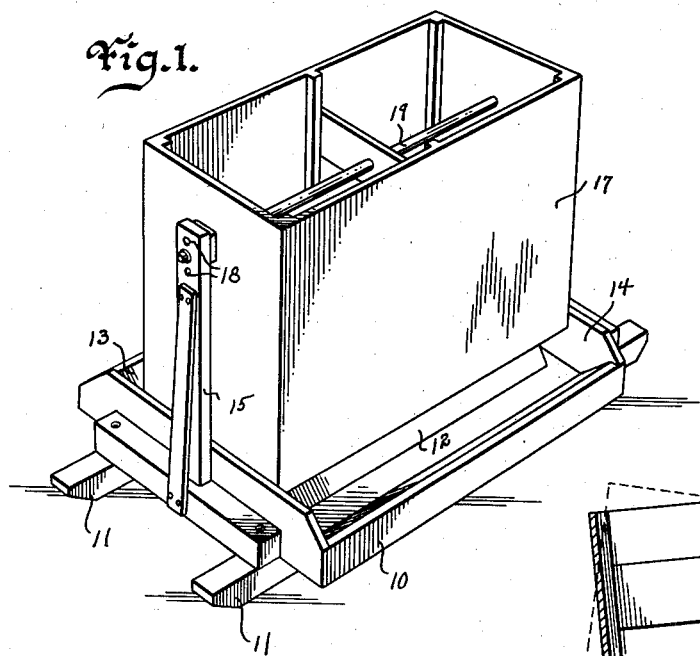
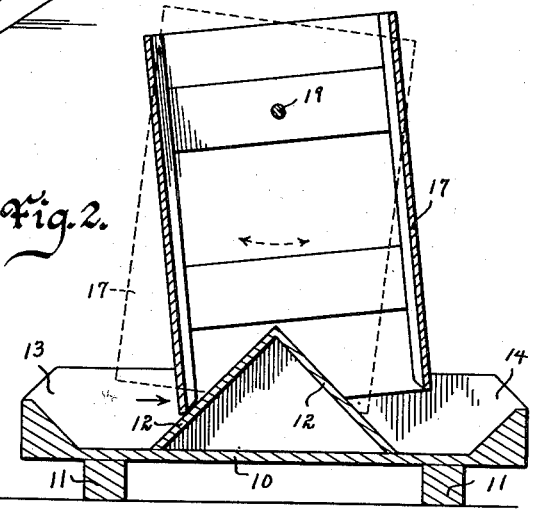
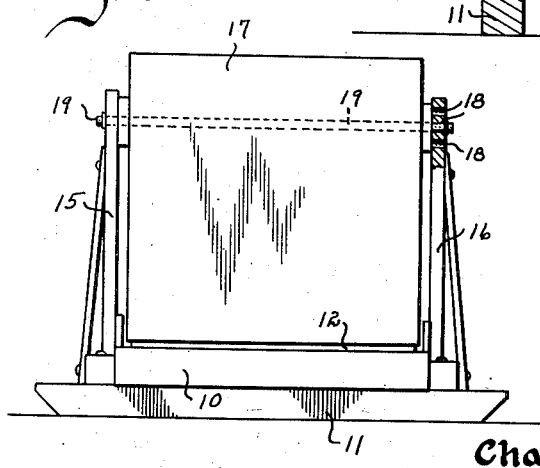
Inventor
Charles Olin Frush
by Talbert Dick & Adler
Attorneys
Witness
Edward P. Seeley United States Patent Office 2,830,557
Patented Apr. 15, 1958

2,830,557
HOG FEEDER

Charles Olin Frush, Oskaloosa, Iowa

Application December 22, 1954, Serial No. 476,941

7 Claims. (Cl. 119—54)

This invention relates to hog feeders and more particularly to a construction that will automatically maintain a supply of feed in the trough or troughs from which the animals feed.

The use of hog feeders is very old, the most common being that of merely an elongated trough into which the feed is manually placed. In recent years, however, most hog feeding means have associated therewith a tank or bin for holding a relatively large supply of feed. Some of these holding bins communicate directly into the trough and while they do facilitate the manual labor of caring for hogs, they do require considerable time and attention from the hog raiser. Much of the trouble is experienced in the clogging of the feed in the bin or chute, and such stoppages of the flow of the feed must be cured by the person caring for the hogs. Still another trouble experienced in hog feeders heretofore used by hog raisers was that while one type of feed would work quite well through the device, other types of feed would either run too rapidly into the feed trough or else would clog up.

Therefore, one of the principal objects of my invention is to provide a hog feeder that supplies the feed to the trough without clogging and without attention from the one caring for the hogs.

More specifically, the object of my invention is to provide a self feeding hog trough that is actuated automatically by the hogs feeding therefrom.

A still further object of my invention is to provide a self feeding hog trough that may be easily and quickly adjusted for the successful handling of different types of feed.

Still further objects of this invention are to provide a hog feeder that is economical in manufacture, durable in use, and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

Fig. 1 is a perspective view of my hog feeder ready for use,

Fig. 2 is a cross sectional view of my hog feeder taken on line 2—2 of Figure 2 and more fully illustrates its construction, and Fig. 3 is a side view of my hog feeder with sections cut away to more fully illustrate the means of vertically adjusting the supply bin relative to the trough portion.

In the drawings I have used the numeral 10 to generally designate a trough portion which if desired may be supported on skid bars 11. The numeral 12 designates a trough divider on the longitudinal inside center bottom of the trough portion 10, as shown in Fig. 2. This trough divider is an inverted V-shape in cross section and inasmuch as it is centrally located divides the trough into two areas 13 and 14. Extending upwardly from each of the center ends of the trough 10 is a vertical post designated by the numerals 15 and 16, respectively. The numeral 17 designates my hopper bin adapted to contain a supply of feed. This supply container 17 may be of any suitable design provided its lower portion is open and rectangular. In the upper end portion of each of the posts 15 and 16 is a row of vertically arranged holes 18. The numeral 19 designates a rod shaft extending through the upper end portion of the tank or like container 17 and selectively through holes 18 in the posts 15 and 16, as shown in Fig. 3. By this construction the supply hopper 17 will be supported by and on the vertical posts 15 and 16 but the support will be a pivotal one in that the lower end portion of the member 17 may be swung forth and back on the rod 19 and between the two posts 15 and 16. The height of the holes 18 above the inside bottom of the trough, and the length of the member 17 from its bottom plane to the rod shaft 19 are such that the dividing member 12 will protrude upwardly and into the supply bin 17, as shown in Fig. 2. This dividing member 12, which has its surface extending downwardly and outwardly in two directions, will not only act as a valve in the bottom of the tank 17 but will act as a stop for the swinging action in two directions of the member 17, as shown by broken lines in Fig. 2. Normally, the supply tank or bin 17 will hang downwardly in a normal position, as shown in Fig. 1. Feed material placed in the supply tank 17 will pass downwardly at each side of the dividing ridge 12 and into the areas 13 and 14 of the trough. As the trough becomes filled with the feed, such feed with the dividing member 12 will stop up the bottom of the tank 17 from further movement of the feed into the trough area. As the feed is eaten up by the hogs the necessary additional amount may pass downwardly into the trough area. However, as we have seen, dry hog feed has a tendency to clog up passageways resulting in no further feed entering the feeding trough. With my device, however, the hogs not getting a sufficient supply of feed into the trough areas will root the lower portion of the member 17 thereby swinging it forth and back on its axis, as shown in Fig. 2, and thereby automatically clearing any jamming of the feed in the supply hopper 17, and causing such feed to properly flow downwardly into the trough areas as needed by the feeding hogs. Thus, the feeding hogs will serve themselves and without any attention from the hog raiser except keeping a sufficient supply of feed in the supply compartment 17. Most hog feed, by proper agitation by the hogs, will feed at the proper rate through the open bottom of the member 17 and at the side of the dividing member 12. However, certain kinds of feed may flow too rapidly while other feed may flow entirely too slowly. Obviously, the adjustment control would be the distance between the sides of the hopper 17 and the dividing member 12, and these spaces are controlled by lowering or raising the member 17 relative to the trough 10. This is accomplished by passing the supporting rod shaft 19 selectively through lower or higher holes 18 in the posts 15 and 16. Also, by the member 12 being of "peaked roof construction" the material will be directed into both the trough areas 13 and 14. Also, by the member 12 extending upwardly and into the lower portion of the supply tank 17, it will contact and clear stoppages well up and within the hopper tank 17 when such member 17 is swung forth and back on its axis.

From the foregoing, it will be seen that I have provided a hog trough that is self feeding and one that will save much time and labor on the part of the hog raiser.

Some changes may be made in the construction and arrangement of my hog feeder without departing from the real spirit and purpose of my invention, and it is my intention to cover by my claims, any modified forms of structure or use of mechanical equivalents which may be reasonably included within their scope.

I claim:

1. In an animal feeder, a trough portion, a dividing member in said trough portion, a vertical post at each end of said trough portion having a plurality of vertically arranged holes, a horizontal shaft selectively extending through holes of said vertical posts, and a feed supply housing supported on said shaft, between said two posts, and having an open botom portion loosely embracing said dividing member, the open bottom of said housing being of the same substantial width as the base of the dividing member, said dividing member sloping laterally in two directions and dividing said trough into two feeding areas.

2. In an animal feeder, a trough portion, a dividing member of inverted V-shape cross section in said trough portion, a feed supply housing operatively swingably supported above said trough portion, and having an open bottom loosely embracing said dividing member, the open bottom of said housing being of the same substantial width as the base of said dividing member.

3. In an animal feeder, a trough portion, a dividing member in said trough portion, said dividing member sloping laterally in two directions and dividing said trough portion into two feeding areas, a feed supply housing operatively swingably supported above said trough portion, and having an open bottom loosely embracing said dividing member, the open bottom of said housing being of the same substantial width as the base of said dividing member.

4. In an animal feeder, a trough portion, a dividing member of inverted V-shape cross section in said trough portion, a feed supply housing operatively swingably supported above said trough portion, and having an open bottom loosely embracing said dividing member, the open bottom of said housing being of the same substantial width as the base of said dividing member, said housing being vertically adjustable relative to said trough portion.

5. In an animal feeder, a trough portion, a dividing member in said trough portion, said dividing member sloping laterally in two directions and dividing said trough portion into two feeding areas, a feed supply housing operatively swingably supported above said trough portion, and having an open bottom loosely embracing said dividing member, the open bottom of said housing being of the same substantial width as the base of said dividing member, said housing being vertically adjustable relative to said trough portion.

6. In an animal feeder, a trough portion, a non-flat dividing member of inverted V-shape cross section in said trough portion, a vertical post at each end of said trough portion having a plurality of vertically arranged holes, a horizontal shaft selectively extending through holes of said vertical posts, and a feed supply housing supported on said shaft, between said two posts, and having an open bottom portion loosely embracing said dividing member, the open bottom of said housing being of the same substantial width as the base of said dividing member.

7. In an animal feeder, a trough portion, a dividing member in said trough portion, said dividing member sloping laterally in two directions and dividing said trough into two feeding areas, a vertical post at each end of said trough portion having a plurality of vertically arranged holes, a horizontal shaft selectively extending through holes of said vertical posts, and a feed supply housing supported on said shaft, between said two posts, and having an open bottom portion loosely embracing said dividing member, the open bottom of said housing being of the same substantial width as the base of the dividing member.

References Cited in the file of this patent

UNITED STATES PATENTS

| 1,755,532 | Bernard et al. | Apr. 22, 1930 |
| 1,858,421 | Yost et al. | May 17, 1932 |
| 2,308,735 | Zahn | Jan. 19, 1943 |
| 2,417,484 | Gifford et al. | Mar. 18, 1947 |
| 2,607,318 | Collier et al. | Aug. 19, 1952 |